(12) United States Patent
Muramatsu et al.

(10) Patent No.: US 7,663,286 B2
(45) Date of Patent: Feb. 16, 2010

(54) COMMUTATOR MOTOR WITH BRUSH BIASED TOWARD INITIAL CONTACT SIDE

(75) Inventors: Toshihiko Muramatsu, Chiryu (JP); Yukio Inuzuka, Okazaki (JP); Ryoichi Honbo, Obu (JP); Masashi Miyamoto, Nishio (JP)

(73) Assignee: Denso Corporation, Kariya (JP)

( * ) Notice: Subject to any disclaimer, the term of this patent is extended or adjusted under 35 U.S.C. 154(b) by 348 days.

(21) Appl. No.: 11/482,694

(22) Filed: Jul. 10, 2006

(65) Prior Publication Data
US 2007/0013260 A1    Jan. 18, 2007

(30) Foreign Application Priority Data
Jul. 12, 2005    (JP) ............... 2005-202695

(51) Int. Cl.
*H01R 39/40* (2006.01)
*H05K 13/00* (2006.01)

(52) U.S. Cl. .................................... 310/247
(58) Field of Classification Search .............. 310/247, 310/233, 245, 246, 261; 417/423.3, 423.7; 123/497
See application file for complete search history.

(56) References Cited

U.S. PATENT DOCUMENTS

| | | | | |
|---|---|---|---|---|
| 2,297,481 | A * | 9/1942 | Krussmann | 318/695 |
| 2,515,768 | A * | 7/1950 | Cooke et al. | 310/247 |
| 4,272,695 | A | 6/1981 | Buchwald et al. | |
| 5,582,510 | A * | 12/1996 | Dobler et al. | 417/423.7 |
| 7,157,828 | B2 * | 1/2007 | Moroto et al. | 310/261 |
| 2003/0202893 | A1 | 10/2003 | Moroto et al. | |
| 2006/0291995 | A1 * | 12/2006 | Ikeya | 415/55.1 |
| 2007/0122300 | A1 * | 5/2007 | Sakai et al. | 417/423.3 |

FOREIGN PATENT DOCUMENTS

| | | |
|---|---|---|
| JP | 52-69502 | 11/1950 |
| JP | 10-146025 | 5/1998 |
| JP | 2000-14091 | 1/2000 |
| JP | 2002-369457 | 12/2002 |
| JP | 2002-369459 | 12/2002 |
| JP | 2003-52152 | * 2/2003 |
| JP | 2003-61315 | * 2/2003 |
| JP | 2004-229452 | 8/2004 |

OTHER PUBLICATIONS

Japanese Official Action dated Jun. 4, 2008 issued in corresponding Japanese Appln. No. 2005-202695 with English translation.
Chinese Office Action dated Nov. 14, 2008 issued in counterpart Chinese Application No. 200610101930.1, with translation.
Chinese Office Action dated Jul. 24, 2009, issued in corresponding Chinese Application No. 200610101930.1, with English translation.

* cited by examiner

*Primary Examiner*—Chandrika Prasad
(74) *Attorney, Agent, or Firm*—Nixon & Vanderhye P.C.

(57) ABSTRACT

A motor includes a rotor, a commutator, a brush, and a bias member. The commutator has a rectifying surface. The commutator rectifies an electric current supplied to the rotor through the rectifying surface. The rotor is rotated by being supplied with the electric current. The brush makes contact with the commutator via the rectifying surface. The rotor is supplied with the electric current through the brush. The brush starts making contact with the commutator on an entry side of the brush as the rotor and the commutator rotate with respect to the brush along a rotative direction and the commutator intermittently makes contact with the brush. The bias member biases the brush toward the entry side.

17 Claims, 6 Drawing Sheets

COMMUTATOR MOTOR WITH BRUSH BIASED TOWARD INITIAL CONTACT SIDE

CROSS REFERENCE TO RELATED APPLICATIONS

This application is based on and incorporates herein by reference Japanese Patent Application No. 2005-202695 filed on Jul. 12, 2005.

FIELD OF THE INVENTION

The present invention relates to a commutator motor.

BACKGROUND OF THE INVENTION

For example, a commutator motor is applied to a fuel pump that supplies fuel from a fuel tank into an internal combustion engine. The fuel pump has a pump device for pressurizing fuel drawn from the fuel tank and discharging into the engine. In such a fuel pump, it is necessary to secure torque for rotating a rotor of the fuel pump in order to enhance discharged fuel in amount and pressure. According to US2003/0202893A1 (JP-A-2004-28083), a fuel pump has a center core and a coil core that are individually provided. In this structure, density of the winding can be increased, so that torque generated by a fuel pump can be enhanced while the device body is restricted from being jumboized.

In the structure disclosed in U.S. '893, the fuel pump includes a motor having a commutator that is constructed of multiple segments. The segments make contact with a brush, and electricity supplied to the commutator is intermitted. In this structure, the brush and the commutator are apt to cause electric discharge therebetween due to a residual current when the brush is released from the commutator. When the brush and the commutator cause electric discharge therebetween, the brush and the commutator may electrically cause abrasion. Consequently, operating life of the brush and the commutator may be reduced.

SUMMARY OF THE INVENTION

In view of the foregoing and other problems, it is an object of the present invention to produce a commutator motor including a brush and a commutator, which are adapted to restricting electric discharge from arising therebetween.

According to one aspect of the present invention, a motor includes a rotor. The motor further includes a commutator that has a rectifying surface. The commutator rectifies an electric current supplied to the rotor through the rectifying surface. The rotor is rotated by being supplied with the electric current. The motor further includes a brush that makes contact with the commutator via the rectifying surface. The rotor is supplied with the electric current through the brush. The brush starts making contact with the commutator on an entry side of the brush when the rotor and the commutator rotate with respect to the brush along a rotative direction and the commutator intermittently makes contact with the brush. The motor further includes a bias member that biases the brush toward the entry side.

Alternatively, the bias member applies bias force to the brush. The bias force applied to the brush on the entry side is greater than the bias force applied to the brush on an opposite side of the entry side with respect to the rotative direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
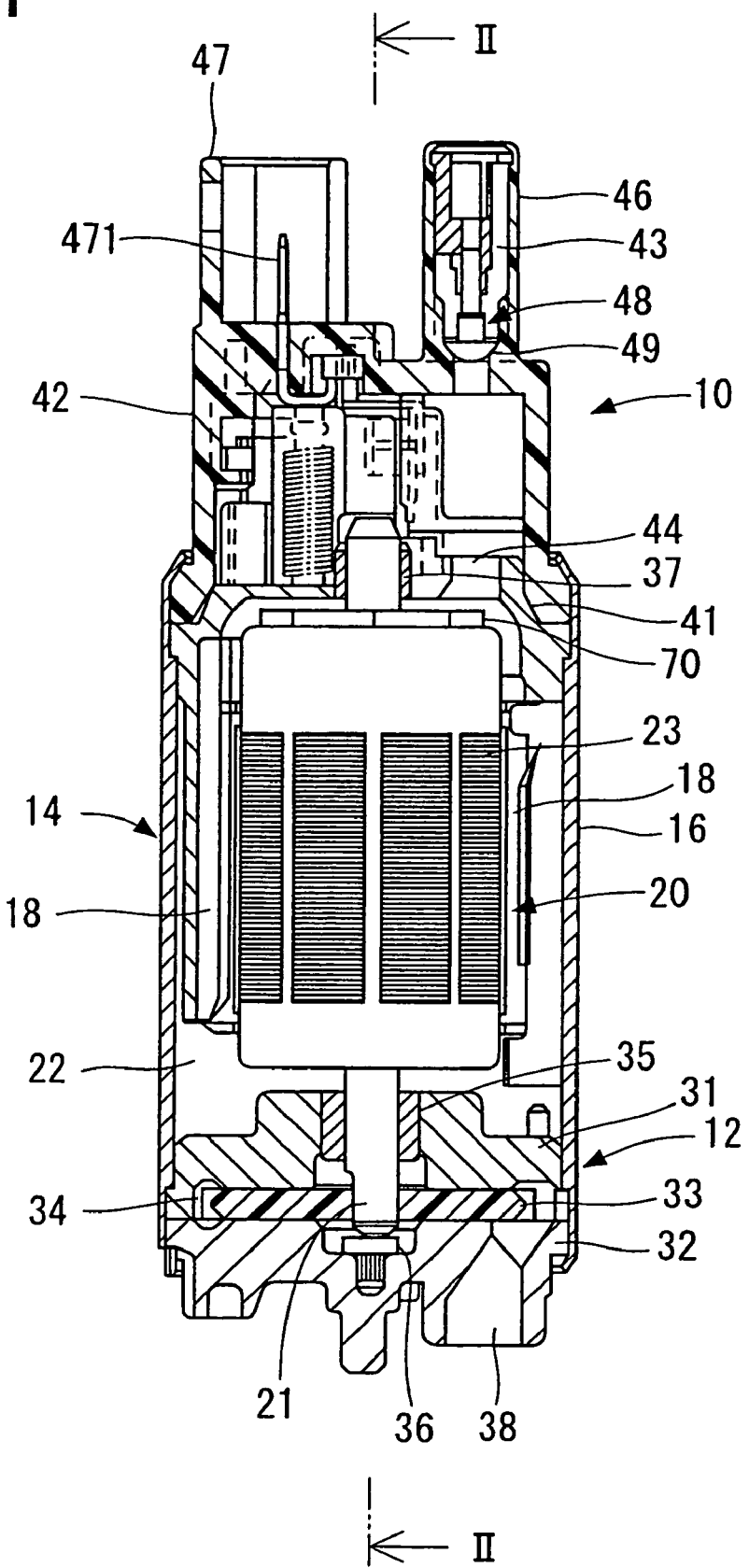
FIG. 1 is a longitudinally partially sectional view showing a fuel pump according to a first embodiment.

As shown in FIG. 1, a fuel pump 10 is an in-tank type pump that is provided to an interior of a fuel tank provided to a vehicle such as an automobile. The fuel pump 10 supplies fuel in the fuel tank to an internal combustion engine. The fuel pump 10 includes a pump device 12 and a motor device 14. The pump device 12 pressurizes fuel drawn from the fuel tank. The motor device 14 drives the pump device 12. The motor device 14 is a DC motor having a brush. The fuel pump 10 includes a housing 16 that is in a substantially cylindrical shape. The housing 16 has an inner periphery, to which permanent magnets 18 are provided along the circumferential direction of the housing 16 such that the permanent magnets 18 are arranged in a substantially annular shape. A rotor 20 is provided inside the inner periphery of the substantially annular permanent magnets 18 such that the rotor 20 is substantially coaxial with respect to the permanent magnets 18.

The pump device 12 includes a casing body 31, a casing cover 32, and an impeller 33 as a rotor member. The casing body 31 and the casing cover 32 form a pump passage 34 in a substantially C-shape. The casing body 31 and the casing cover 32 rotatably accommodate the impeller 33 therebetween. The casing body 31 and the casing cover 32 are formed of aluminum die-cast, for example. The casing body 31 is press-inserted into one axial end of the housing 16. A bearing 35 is provided to a center of the casing body 31. The casing cover 32 is fixed by crimping, for example, to one end of the housing 16 in a condition, in which the casing cover 32 is surrounded by the casing body 31. A thrust bearing 36 is fixed to a center of the casing cover 32. The rotor 20 has a shaft 21 that is rotatably supported by a bearing 35 radially at one end thereof. The shaft 21 is axially supported by the thrust bearing 36. The shaft 21 has the other end that is rotatably supported radially by a bearing 37.

The casing cover 32 has a fuel inlet 38. The impeller 33 having vane grooves at periphery thereof rotates in the pump passage 34, so that fuel in a fuel tank (not shown) is drawn into the pump passage 34 through the fuel inlet 38. Fuel drawn into the pump passage 34 is pressurized by rotation of the impeller 33, and discharged to a pump chamber 22 of a motor device 14.

The housing 16 has the other end on the opposite side of both the casing body 31 and the casing cover 32. The other end of the housing 16 is provided with a motor casing 41 and a discharge cover 42. The motor casing 41 is interposed between the discharge cover 42 and the housing 16. The discharge cover 42 is crimped, thereby being fixed to the housing 16. The motor casing 41 has a communication passage 44 that communicates the pump chamber 22 with a fuel passage 43 of the discharge cover 42.

Figure 2:
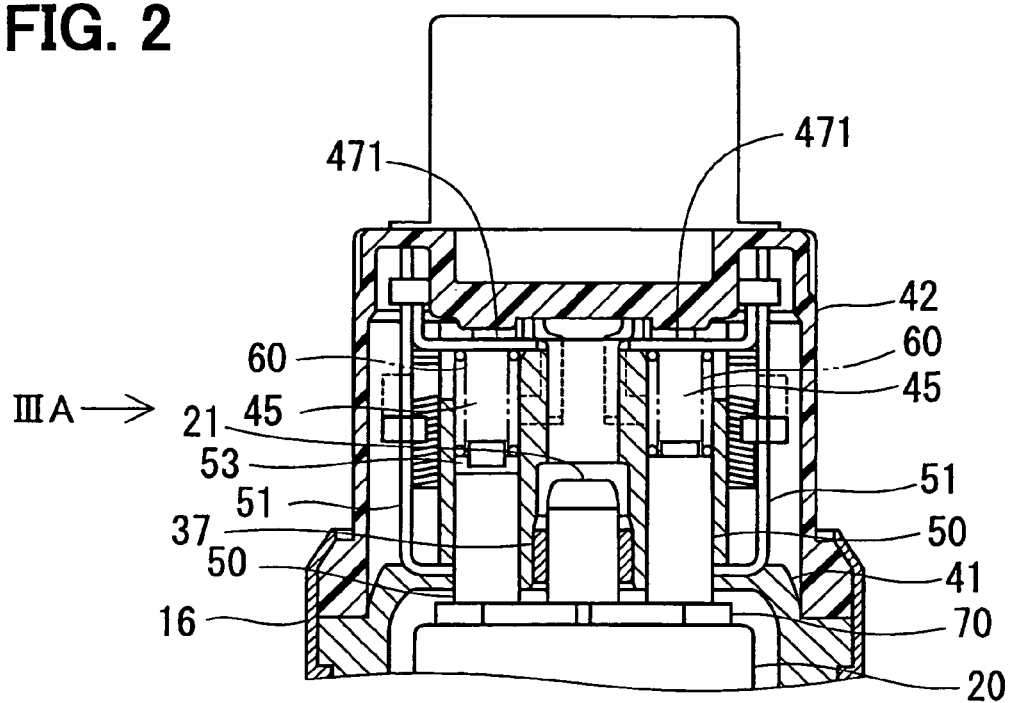
FIG. 2 is a partially sectional view taken along the line II-II in FIG. 1.

As shown in FIG. 2, the motor casing 41 has an accommodation chamber 45 that accommodates the brush 50 slidably with respect to the axial direction thereof. The motor casing 41 serves as a housing member that defines the accommodation chamber 45 receiving the brush 50. The accommodation chamber 45 of the motor casing 41 accommodates the brush 50 and a spring 60, which serves as a bias member. The spring 60 biases the brush 50 to the side of the rotor 20.

Figure 3A:
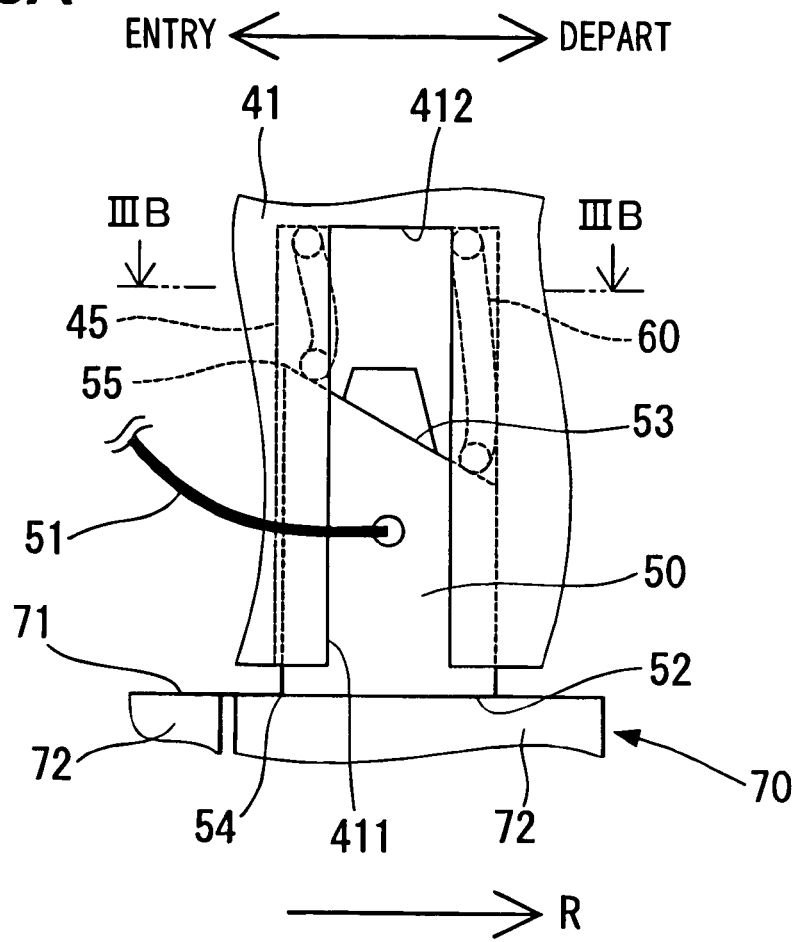
FIG. 3A is a schematic view when being viewed from the arrow IIIA in FIG. 2.
Figure 3B:
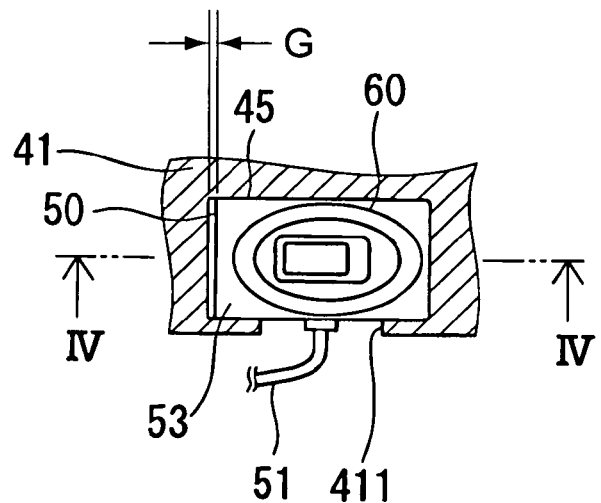
FIG. 3B is a partially sectional view taken along the line IIIB-IIIB in FIG. 3A.

As referred to FIG. 1, the discharge cover 42 has a fuel discharge portion 46 and a connector 47 around the outer periphery of the shaft 21. The fuel discharge portion 46 has the fuel passage 43 and a pressure control valve 48. The fuel passage 43 is communicated and blocked by a valve member 49 of the pressure control valve 48. The valve member 49 communicates the fuel passage 43 when pressure of fuel in the fuel pump 10 becomes greater than a predetermined pressure. The connector 47 has a terminal 471. As referred to FIG. 2, the terminal 471 connects electrically with a conductive member 51. As shown in FIGS. 3A, 3B, the conductive member 51 connects electrically with the brush 50 at an end thereof on the opposite side of the terminal 471.

As referred to FIG. 1, the rotor 20 is rotatably accommodated in the housing 16. A coil 23 is constructed of a core that has the outer periphery around which winding is wound. The commutator 70 is in a substantially disc-shape. The commutator 70 is arranged on the upper side of the rotor 20 in FIG. 1. That is, the commutator 70 is provided to the end of the rotor 20 on the opposite side of the pump device 12. The commutator 70 makes contact with the brush 50 that is pressed by the spring 60 onto the commutator 70.

Electric power is supplied to the terminal 471 from an unillustrated power source, so that the coil 23 of the rotor 20 is supplied with the electric power via the conductive member 51, the brush 50, and the commutator 70. The rotor 20 is rotated by the electric power supplied to the coil 23, so that the impeller 33 rotates together with the rotor 20 and the shaft 21. The commutator 70 rotates in conjunction with rotation of the rotor 20. The commutator 70 rotates while maintaining making contact with the brush 50. The impeller 33 rotates with the shaft 21 of the rotor 20, so that fuel is drawn into the pump passage 34 through the fuel inlet 38. Fuel drawn into the pump passage 34 is discharged from the pump passage 34 into the pump chamber 22 by being applied with kinetic energy from the vane grooves of the impeller 33. Fuel discharged into the pump chamber 22 is supplied to the outside of the fuel pump 10 after passing around the rotor 20 and the fuel passage 43.

Next, the brush 50 is described.

As referred to FIGS. 2, 3A, 3B, and 4, the brush 50 is accommodated in the accommodation chamber 45 of the motor casing 41. The brush 50 is axially movable in the accommodation chamber 45. For example, the brush 50 axially reciprocates as being guided by the motor casing 41. As referred to FIGS. 3A, 3B, an opening 411 is defined in the motor casing 41 partially with respect to the circumferential direction thereof. The conductive member 51, which connects with the brush 50, is exposed through the opening 411 of the motor casing 41. In this structure, even when the brush 50 axially reciprocates in the motor casing 41, the conductive member 51 axially moves in conjunction with the brush 50, so that connection between the conductive member 51 and the brush 50 can be maintained. The interior of the accommodation chamber 45 of the motor casing 41 is greater than the brush 50. The brush 50 and the motor casing 41 have a slight gap therebetween. The slight gap between the brush 50 and the motor casing 41 depicted in FIGS. 3A, 3B, and 4 may be relatively greater than an actual size thereof, because of facilitating explanation of the structure.

The brush 50 connects with the spring 60 at one axial end of the brush 50. The spring 60 connects with the brush 50 at one end of the spring 60. The spring 60 connects with a top portion 412 of the motor casing 41 at the other end of the spring 60. The spring 60 is resilient. In this structure, the brush 50 is pressed onto a rectifying surface 71 of the commutator 70. An end surface 52 of the brush 50 on the side of the commutator 70 makes contact with the rectifying surface 71, which is the end surface of the commutator 70 on the side of the brush 50. The commutator 70 is constructed of multiple segments 72 that are circumferentially divided.

Figure 4:
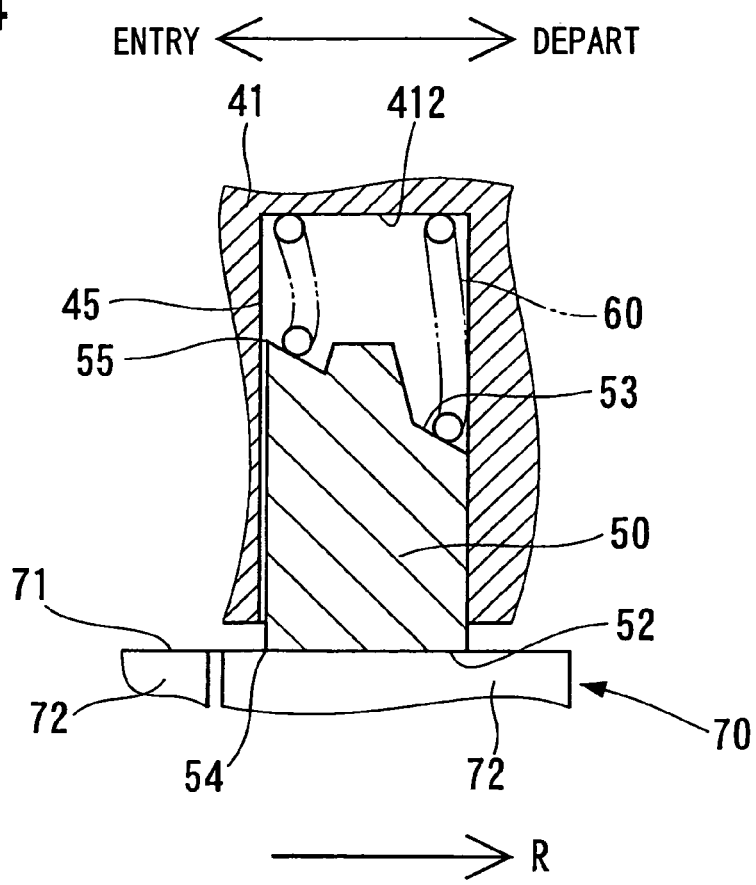
FIG. 4 is a partially sectional view taken along the line IV-IV in FIG. 3B.
Figure 5:
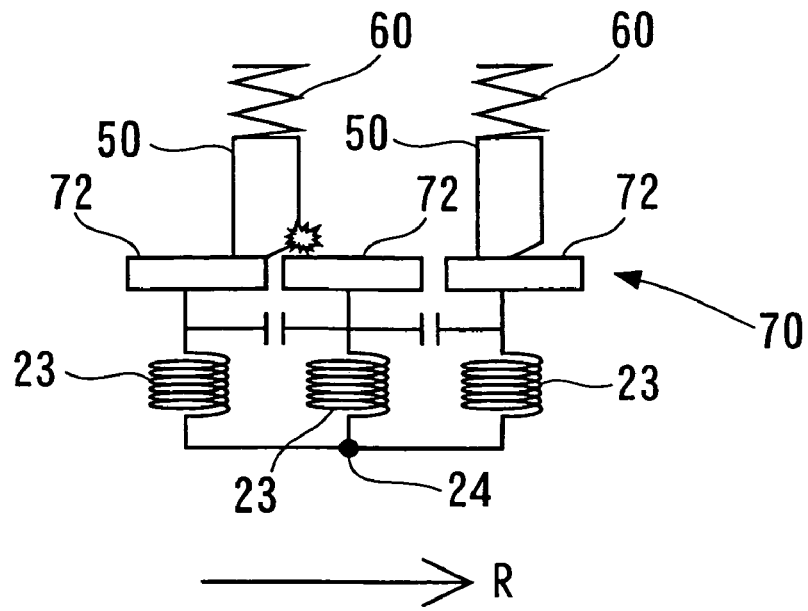
FIG. 5 is a schematic view showing a structure of coils of the fuel pump.

As shown in FIG. 5, each of the segments 72 connects with each of the windings of the coils 23. Each of the brush 50 repeatedly makes contact with each segment 72 of the commutator 70, so that an electric current supplied to the coils 23 is rectified. The commutator 70 rotates along a rotative direction depicted by the arrow R shown in FIGS. 3A, 3B, 4, and 5, together with the rotor 20.

As referred to FIGS. 3A, 3B, 4, as the commutator 70 rotates, the brush 50 makes contact with the rotating commutator 70 from a side of entry (entry side) of the bush 50. By contrast, as the commutator 70 rotates, the contact between the brush 50 and the rotating commutator 70 is released on a side of depart (depart side) of the bush 50. That is, in FIGS. 3A, 4, the left side of the brush 50 corresponds to the entry side, and the right side of the brush 50 corresponds to the depart side.

Figure 6:
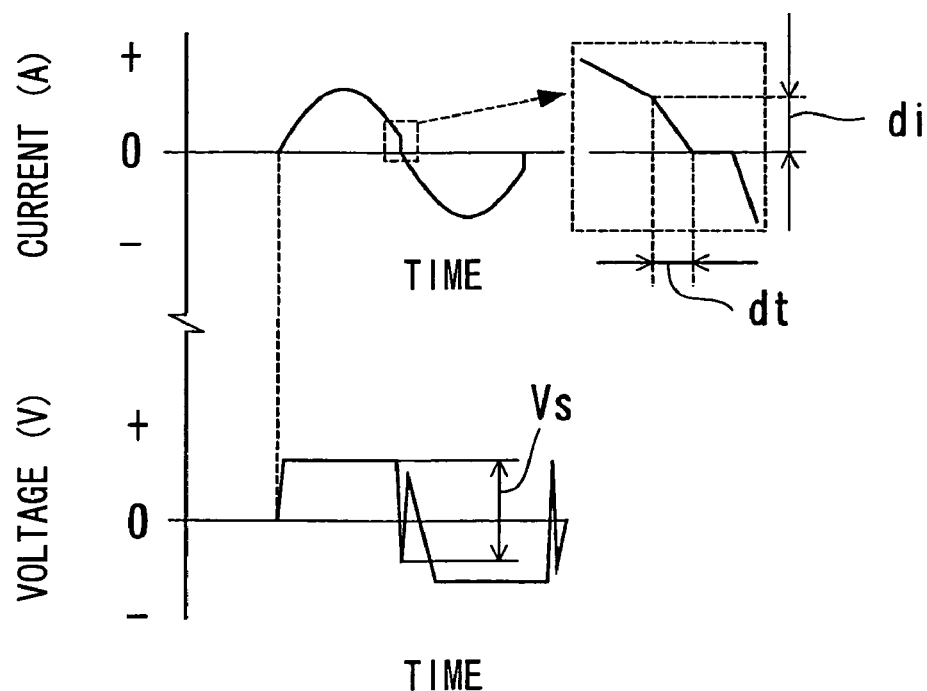
FIG. 6 is a time chart showing behaviors of an electric current and voltage between a brush and a commutator of the fuel pump.

As referred to FIG. 5, one end of each of the coils 23 connects with a connecting portion 24, and the other end of the coil 23 connects with the corresponding one of the segments 72 of the commutator 70 in a structure of the rotor 20 having the coils 23, which are connected in a manner of star connection. Therefore, as shown in FIG. 6, when the contact between the brush 50 and the segment 72 of the commutator 70 is released, a residual current di drastically changes within a short period dt. Consequently, electric energy accumulated in the coil 23 is discharged between the brush 50 and the commutator 70, so that surge voltage Vs is applied between the brush 50 and the commutator 70. Thus, the brush 50 and the commutator 70 cause an electric discharge therebetween. The electric discharge between the brush 50 and the commutator 70 may electrically cause ablation between the brush 50 and the commutator 70.

Figure 7:
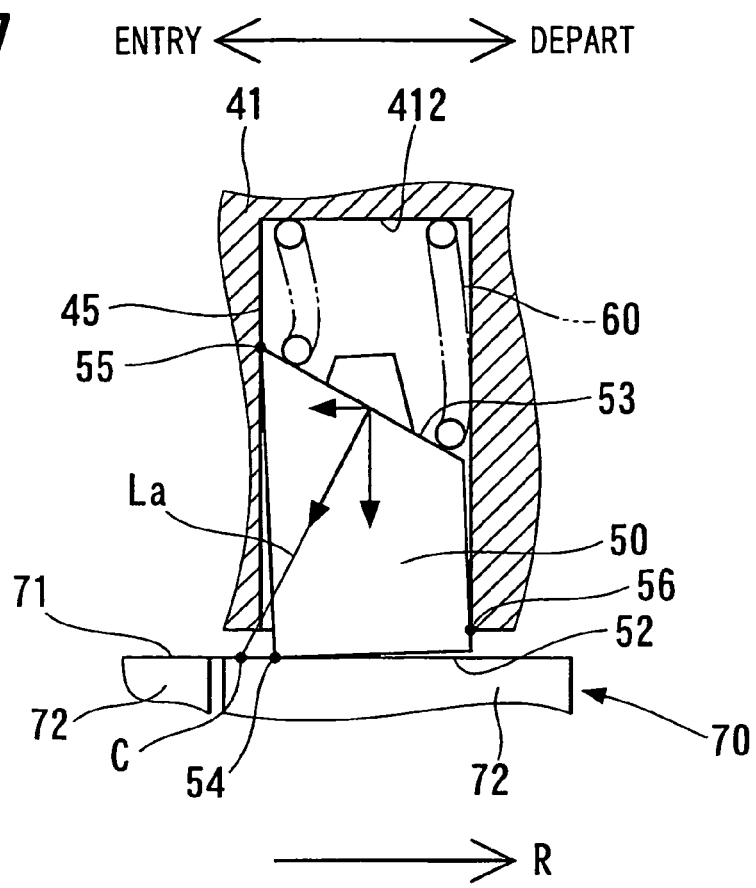
FIG. 7 is a view showing the brush applied with force.

In this embodiment, as referred to FIGS. 1 to 4, the brush 50 has a slant surface 53 on the opposite side of the commutator 70. The slant surface 53 is inclined such that the length of the brush 50 is reduced from the entry side to the depart side of the brush 50. That is, the length of the brush 50 is long on the side of the entry side. The length of the brush 50 is short on the side of the depart side. The end of the spring 60 on the opposite side of the upper portion 412 connects with the slant surface 53 of the brush 50. Bias force of the spring 60 is substantially vertically applied to the slant surface 53. Therefore, as shown in FIG. 7, the line of action La depicting the direction of the bias force of the spring 60 is substantially perpendicular to the slant surface 53. The bias force of the spring 60 is applied to the slant surface 53 of the brush 50, so that the spring 60 presses the brush 50 toward the commutator 70 while inclining the brush 50 toward the entry side.

In this structure, as referred to FIGS. 3A, 4, the brush 50 makes contact with the commutator 70 via the rectifying surface 71. The rotor 20 is supplied with the electric current through the brush 50. The brush 50 starts making contact with the commutator 70 on the entry side of the brush 50, as the rotor 20 and the commutator 70 rotate with respect to the brush 50 along the rotative direction and the commutator 70 intermittently makes contact with the brush 50. The brush 50 has a first brush end on the side of the commutator 70 on the lower side in FIG. 3A. The brush 50 has a second brush end on the opposite side of the commutator 70, i.e., on the upper side in FIG. 3A. The second brush end has the slant surface 53. The first brush end is distant from the slant surface 53 for an axial length with respect to an axial direction of the brush 50. The axial direction of the brush 50 corresponds to a substantially vertical direction in FIG. 3A. The axial length on the entry side is greater than the axial length on the opposite side (depart side) of the entry side with respect to the rotative direction of the rotor 20.

The bias member 60 has an end that makes contact with the slant surface 53 of the brush 50. The bias force applied to the brush 50 on the entry side is greater than the bias force applied to the brush 50 on the opposite side (depart side) of the entry side with respect to the rotative direction.

In this structure, as shown in FIG. 7, the brush 50, which defines the slight gap G (as labeled in FIG. 3B and shown in FIGS. 3A, 3B, and 4) relative to the motor casing 41, is inclined slightly toward the entry side. The slant of the brush 50 depicted in FIG. 7 may be relatively greater than an actual slant thereof, because of facilitating explanation of the structure.

The accommodation chamber 45 of the motor casing 41 accommodates the spring 60 in addition to the brush 50. As shown in FIG. 3B, the cross section of the spring 60 is in a substantially ellipse, so that the contact area, via which the spring 60 makes contact with the slant surface 53, becomes large. Thus, the bias force of the spring 60 can be steadily applied to the slant surface 53 of the brush 50.

The cross section of the spring 60 is defined to be the substantially ellipse, so that the spring 60 can be accommodated in the accommodation chamber 45 having a substantially rectangular cross section. Therefore, the spring 60 does not protrude out of the opening 411 of the motor casing 41. Consequently, the conductive member 51 protruding from the brush 50 can be restricted from causing interference with the spring 60 when the spring 60 expands and shrinks in conjunction with axial movement of the brush 50. Thus, the brush 50 can be smoothly moved, and the spring 60 can be smoothly expanded and shrunk.

In this embodiment, as referred to FIG. 7, at the rectifying surface 71 of the commutator 70, the line of action La of the spring 60 is located in the outside relative to the end of the brush 50 on the entry side. That is, the line of action La of the spring 60 intersects with the rectifying surface 71 at the intersection C in the outer region with respect to the end of the brush 50 on the entry side. The angle of the line of action La of the spring 60 changes corresponding to the angle of the slant surface 53 of the brush 50. Therefore, in this embodiment, the slant surface 53 of the brush 50 is inclined by a slant angle such that the line of action La of the spring 60 intersects with the rectifying surface 71 in the outside of the brush 50. The slant angle of the slant surface 53 of the brush 50 can be modified in accordance with dimensions such as the width of the brush 50 and the length between the end of the brush 50 on the side of the commutator 70 and the slant surface 53.

The line of action La of the bias force applied from the spring 60 to the brush 50 intersects with the rectifying surface 71 of the commutator 70 on the outer side relative to the brush 50. In this structure, the brush 50 is inclined in the motor casing 41 around a corner 54 of the end of the brush 50 on the side of the commutator 70. The corner 54 is located on the entry side of the brush 50. The commutator 70 is inclined, so that the brush 50 is applied with force toward the depart side at the corner 54 thereof by friction relative to the commutator 70. Therefore, the brush 50 is inclined to the entry side in the motor casing 41 by the bias force of the spring 60 and friction relative to the commutator 70. In this condition, the brush 50 is inclined around the corner 54 making contact with the commutator 70, so that the brush 50 makes contact with the motor casing 41 at a corner 55 between the end of the brush 50 on the entry side and the slant surface 53. The brush 50 makes contact with the end of the motor casing 41 on the depart side thereof in the vicinity of the commutator 70. The brush 50 has a contact portion 56, at which the brush 50 makes contact with the end of the motor casing 41 on the depart side thereof in the vicinity of the commutator 70. Consequently, the brush 50 makes contact with the motor casing 41 at the corner 55 and the contact portion 55. In addition, the brush 50 makes contact with the commutator 70 at the corner 54. In this structure, the brush 50 is supported at the three points including the corners 54, 55 and the contact portion 55 when the commutator 70 is inclined. Therefore, the brush 50 becomes steady in position within the motor casing 41 when the commutator 70 is inclined, so that noise and vibration can be restricted from arising in the operation of the fuel pump 10.

Figure 8:
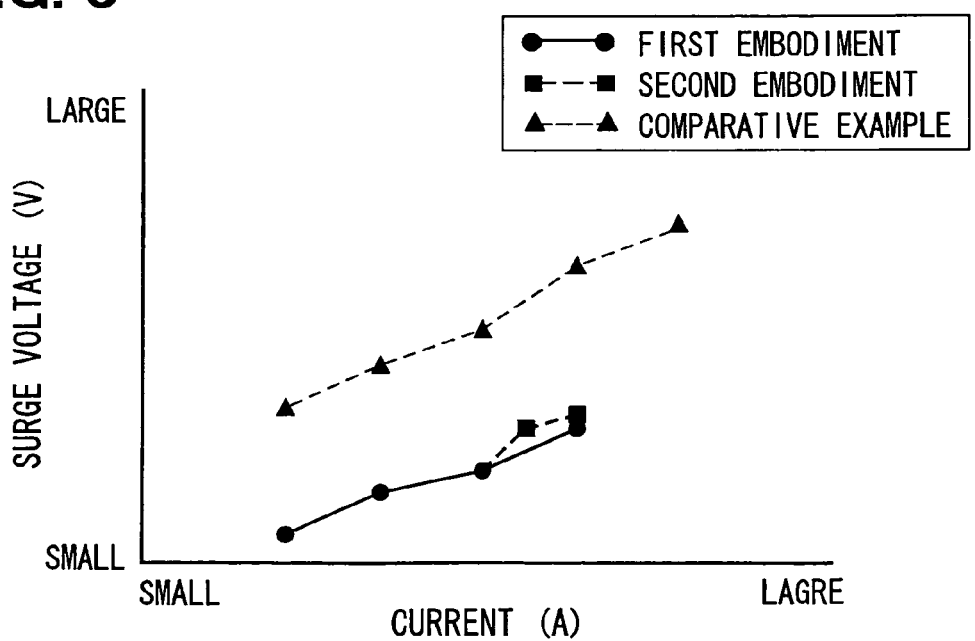
FIG. 8 is a graph showing an electric current, which flows between the brush and the commutator, and surge voltage.

In the above structure of this embodiment, as shown in FIG. 8, surge voltage applied between the brush 50 and the commutator 70 can be reduced. FIG. 8 depicts a comparative example having a structure, in which the brush 50 is inclined toward the depart side by the spring 60. Thus, in this embodiment, surge voltage applied between the brush 50 and the commutator 70 can be reduced. Therefore, the brush 50 and the commutator 70 can be restricted from causing electric ablation accompanied with the operation of the fuel pump 10. Particularly, if the operation of the fuel pump 10 is terminated due to ablation caused in the brush 50 and the commutator 70, fuel supply to the engine of the vehicle may be terminated. Accordingly, for example, the brush 50 and the commutator 70 need to be regularly replaced, frequently in general. By contrast, in this embodiment, the brush 50 and the commutator 70 can be restricted from causing electrical ablation, so that an operating life of the brush 50 and the commutator 70 can be extended. Thus, frequency of replacing the brush 50 and the commutator 70 can be reduced.

Second Embodiment

Figure 9:
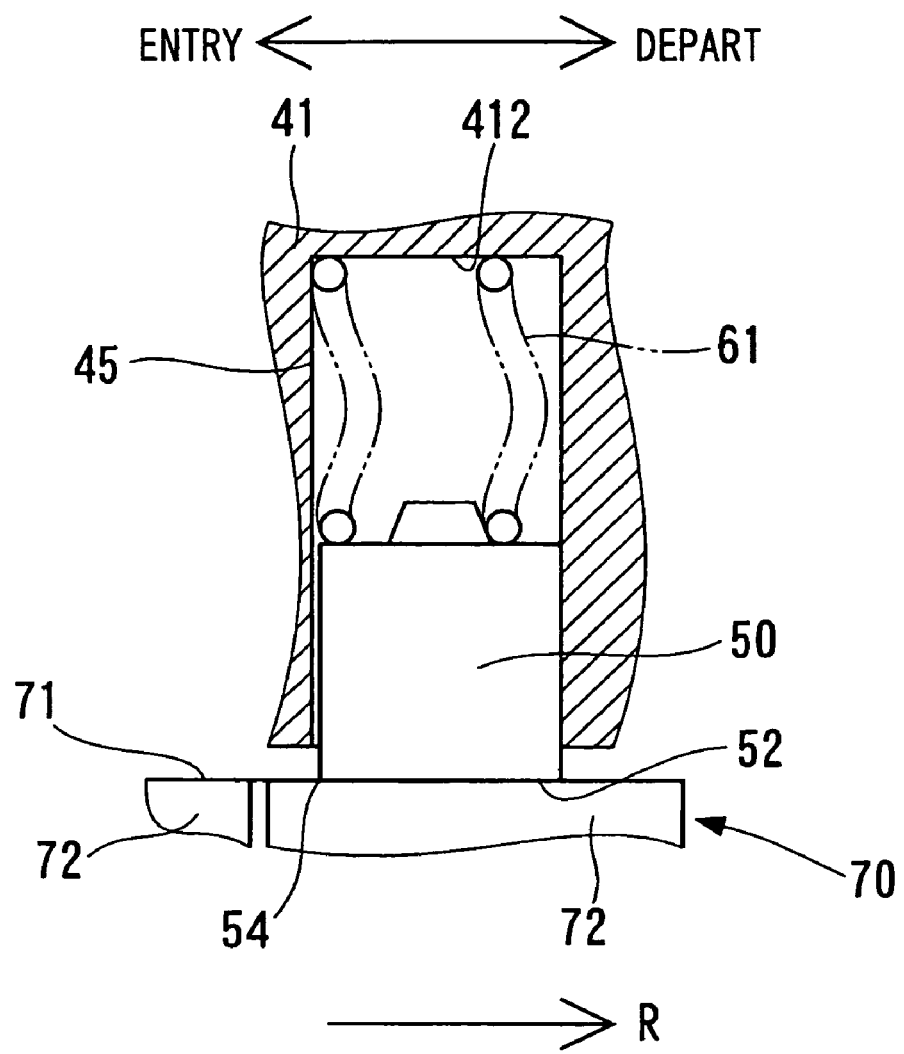
FIG. 9 is a schematic view showing a brush of a fuel pump according to a second embodiment.

In this embodiment, as shown in FIG. 9, a spring 61 for biasing the brush 50 toward the commutator 70 is made to cause buckling in the motor casing 41. The buckling is a condition, in which the spring 61 is substantially axially applied with compression force, so that the spring 61 is bent in the motor case 41. The spring 61 applies force toward the brush 50 such that the brush 50 is inclined toward the entry side similarly to the first embodiment. In this structure, the spring 61 applies force such that the brush 50 is inclined toward the entry side by causing buckling in the spring 61 toward a predetermined direction. Furthermore, the brush 50 is pressed onto the rectifying surface 71 of the commutator 70 by the spring 61. Consequently, as refereed to FIG. 8, surge voltage between the brush 50 and the commutator 70 can be reduced, compared with the comparative embodiment. Therefore, in this embodiment, the brush 50 and the commutator 70 can be also restricted from causing electrical ablation, so that an operating life of the brush 50 and the commutator 70 can be extended.

In this embodiment, the spring 61 is made to be in the buckling condition, so that the brush 50 is inclined toward the entry side. The bias force applied from the spring 61 to the brush 50 is changed in direction corresponding to the buckling condition of the spring 61. Therefore, the spring 61 needs to be in a predetermined buckling condition. Preferably, in the condition depicted by FIG. 9, a substantially center portion (axial center) of the spring 61 with respect to the axial direction thereof causes buckling directed to the depart side in the motor casing 41 in order to incline the brush 50 toward the entry side. For example, a magnet is provided on the depart side of the motor casing 41, so that the spring 61 can regularly cause buckling toward the motor casing 41 by magnetic attractive force generated by the magnet. Alternatively, a jig having a magnet may be provided on the entry side of the motor casing 41 when the spring 61 is assembled to the motor casing 41, for example. In this structure, the upper and lower ends of the spring 61 may be directed toward the entry side, and the axial center of the spring 61 may be directed toward the depart side in the motor casing 41. In this structure, the spring 61 can also cause buckling, as being properly directed. The spring 61 may mechanically cause buckling in the motor casing 41. The spring 61 may be provided to an engaging member such as a hook, so that the spring 61 may cause buckling in a predetermined direction.

In the above structure, the spring biases the brush to the entry side. In general, electric discharge caused between the brush and the commutator may change corresponding to a condition, in which the brush is biased to the commutator. For example, the electric discharge between the brush and the commutator decreases when the brush is biased to the entry side, in which the brush starts making contact with the commutator. By contrast, for example, the electric discharge between the brush and the commutator increases when the brush is biased to the depart side, in which contact between the brush and the commutator is released. In the above structure, the brush is biased to the entry side using the bias member, so that electric discharge between the brush and the commutator can be reduced. Therefore, the brush and the commutator can be restricted from electrically causing ablation, so that the brush and the commutator can be enhanced in operating life.

The motors in the above embodiments are not limited to be applied to fuel pumps. The motors having the above structures may be applied to various apparatuses other than hydraulic pumps.

The above structures of the embodiments can be combined as appropriate.

Various modifications and alternations may be diversely made to the above embodiments without departing from the spirit of the present invention.

What is claimed is:

1. A motor comprising:
   a rotor;
   a commutator that has a rectifying surface for rectifying an electric current supplied to the rotor, the commutator being constructed of multiple segments that are circumferentially divided;
   a brush that repeatedly makes contact with each segment of the commutator via the rectifying surface of the commutator and conducts the electric current when the rotor and the commutator rotate relative to the brush along a rotative direction, the brush initially making each said contact with each segment of the commutator on an entry side of the brush when the rotor and the commutator rotate with respect to the brush along the rotative direction;
   a bias member that biases the brush; and
   a housing member in which the brush is axially slidable,
   wherein the brush has a first brush end on a side of the commutator,
   the brush has a second brush end at an opposite end of the brush with respect to the commutator, the second brush end having a slant surface,
   an axial length on the entry side is greater than an axial length on an opposite side of the brush from the entry side, with respect to the rotative direction,
   the bias member is in contact with the slant surface of the brush and applies bias force to the slant surface toward the entry side along a line of action,
   the housing member defining a gap with the brush in the rotative direction to enable the brush to incline within the gap,
   the line of action intersects the rectifying surface at an intersection which is located on the entry side and outside of the brush,
   the brush has an entry side first corner, which is on the entry side at the first brush end and makes contact with the rectifying surface, and an entry side second corner, which is on the entry side at the second brush end,
   the brush is enabled to incline around the entry side first corner,
   the brush is in contact with an inner wall of the housing member at the entry side second corner when the brush inclines,
   the brush further has a contact portion, which is on an opposite side of the brush from the entry side with respect to the rotative direction and is in contact with an inner wall of the housing member,
   the brush is supported at the entry side first corner, the entry side second corner, and the contact portion, and
   the bias member applies bias force to the brush at an angle relative to the rectifying surface to incline the brush so that the housing supports the brush at the entry side second corner and so that the contact portion is in line contact with the housing.

2. The motor according to claim 1, wherein the bias member causes buckling in the housing member.

3. The motor according to claim 2, wherein the bias member is substantially axially applied with compression force to cause buckling in the housing member.

4. The motor according to claim 1, wherein the bias member has a cross section that is in a substantially ellipse received within the housing member.

5. The motor according to claim 1, further comprising:
   a conductive member that connects with the brush, the brush being supplied with the electric current through the conductive member,
   wherein the housing member has an opening through which the conductive member extends from the brush.

6. The motor according to claim 1, wherein the bias force applied to the brush on the entry side is greater than the bias force applied to the brush on an opposite side of the entry side with respect to the rotative direction.

7. A hydraulic pump comprising:
the motor according to claim 1; and
a pump device that is driven by the motor for pumping fluid.

8. The motor according to claim 1, wherein the rectifying surface is substantially flat.

9. The motor according to claim 1, wherein the rectifying surface is substantially perpendicular to an axial direction of the rotor.

10. The motor according to claim 1, wherein the axial direction of the brush is substantially in parallel with an axial direction of the rotor.

11. A motor comprising:
a rotor;
a commutator that has a rectifying surface for rectifying an electric current supplied to the rotor, the commutator being constructed of multiple segments that are circumferentially divided;
a brush that repeatedly makes contact with each segment of the commutator via the rectifying surface and therethrough supplies the electric current to the rotor, the brush initially making each said contact with each segment of the commutator on an entry side of the brush when the rotor and the commutator rotate with respect to the brush along a rotative direction;
a bias member that applies bias force to the brush, and
a housing member in which the brush is axially slidable, wherein
the brush has a brush end on a side of the commutator,
the housing member defining a gap with the brush in the rotative direction to enable the brush to incline within the gap,
the bias force applied by the bias member on the entry side being greater than the bias force applied by the bias member on an opposite side of the brush from the entry side with respect to the rotative direction,
the line of action intersects the rectifying surface at an intersection which is located on the entry side and outside of the brush,
the brush has an entry side first corner, which is on the entry side at the brush end and makes contact with the rectifying surface, and an entry side second corner, which is on the entry side adjacent a surface via which the brush receives the bias force from the bias member,
the brush is enabled to incline around the entry side first corner,
the brush is in contact with an inner wall of the housing member at the entry side second corner when the brush inclines,
the brush further has a contact portion, which is on an opposite side of the brush from the entry side with respect to the rotative direction and is in contact with an inner wall of the housing member,
the brush is supported at the entry side first corner, the entry side second corner, and the contact portion, and
the bias member applies bias force to the brush at an angle relative to the rectifying surface to incline the brush so that the housing supports the brush at the entry side second corner and so that the contact portion is in line contact with the housing.

12. The motor according to claim 11, wherein the bias member biases the brush toward the entry side.

13. A hydraulic pump comprising:
the motor according to claim 11; and
a pump device that is driven by the motor for pumping fluid.

14. A hydraulic pump comprising:
a motor; and
a pump device that is driven by the motor for pumping fluid,
wherein the motor includes:
a rotor;
a commutator that has a rectifying surface for rectifying an electric current supplied to the rotor, the commutator being constructed of multiple segments that are circumferentially divided;
a brush that repeatedly makes contact with each segment of the commutator via the rectifying surface and therethrough supplies the electric current to the rotor, the brush initially making each said contact with each segment of the commutator on an entry side of the brush when the rotor and the commutator rotate with respect to the brush along a rotative direction;
a bias member that applies bias force to the brush, and
a housing member in which the brush is axially slidable, wherein
the brush has a brush end on a side of the commutator,
the housing member defining a gap with the brush in the rotative direction to enable the brush to incline within the gap,
the bias force applied by the bias member on the entry side being greater than the bias force applied by the bias member on an opposite side of the brush from the entry side with respect to the rotative direction,
the line of action intersects the rectifying surface at an intersection which is located on the entry side and outside of the brush,
the brush has an entry side first corner, which is on the entry side at the brush end and makes contact with the rectifying surface, and an entry side second corner, which is on the entry side adjacent a surface via which the brush receives the bias force from the bias member,
the brush is enabled to incline around the entry side first corner,
the brush is in contact with an inner wall of the housing member at the entry side second corner when the brush inclines,
the brush further has a contact portion, which is on an opposite side of the brush from the entry side with respect to the rotative direction and is in contact with an inner wall of the housing member,
the brush is supported at the entry side first corner, the entry side second corner, and the contact portion, and
the bias member applies bias force to the brush at an angle relative to the rectifying surface to incline the brush so that the housing supports the brush at the entry side second corner and so that the contact portion is in line contact with the housing.

15. A motor comprising:
a rotor;
a commutator having a multiple segments, which are circumferentially divided, and a rectifying surface for rectifying an electric current supplied to the rotor;
a brush configured to initially make contact with each of the multiple segments on an entry side of the brush when the rotor and the commutator rotate relative to the brush along a rotative direction and when the brush intermittently makes contact with the multiple segments via the rectifying surface to conduct the electric current;
a housing member accommodating the brush and defining a gap with the brush in the rotative direction to enable the brush to slide and incline within the gap; and
a bias member, wherein the brush has:
a first brush end located on a side of the commutator, the first brush end having an entry side first corner, which is on the entry side and configured to make contact with the rectifying surface, and a contact portion, which is on an opposite side of the brush from the entry side with respect to the rotative direction and is in line contact with a corner of the housing member on a side of the rectifying surface, and
a second brush end located at an opposite end of the brush with respect to the commutator, the second brush end defining a slant surface having an entry side second corner, which is on the entry side and in contact with an inner wall of the housing member, and
wherein the bias member is in contact with the slant surface of the brush and applies bias force to the slant surface toward the entry side at an angle relative to the rectifying surface, thereby to incline the brush around the entry side first corner to cause the housing to support the brush at the entry side second corner and to cause the contact portion to be in line contact with the housing.

16. The motor according to claim 15, wherein the bias member inclines the brush around the entry side first corner to cause the entry side first corner to make point-contact with the rectifying surface so as to reduce surge voltage between the brush and the commutator.

17. The motor according to claim 16,
wherein the biasing member is a coil spring, and
the slant surface has a protrusion to support the biasing member not to displace the biasing member from the slant surface.

* * * * *